United States Patent [19]

Kajita

[11] Patent Number: 5,281,981
[45] Date of Patent: Jan. 25, 1994

[54] METHOD AND APPARATUS FOR FORMING IMAGE HAVING PLURAL IMAGE FORMING STATIONS

[75] Inventor: Koji Kajita, Yokohama, Japan

[73] Assignee: Canon Kabushiki Kaisha, Tokyo, Japan

[21] Appl. No.: 859,715

[22] PCT Filed: Oct. 11, 1991

[86] PCT No.: PCT/JP91/01388
§ 371 Date: Jun. 11, 1992
§ 102(e) Date: Jun. 11, 1992

[87] PCT Pub. No.: WO92/07305
PCT Pub. Date: Apr. 30, 1992

[30] Foreign Application Priority Data

Oct. 12, 1990 [JP] Japan .................. 2-273824
Oct. 12, 1990 [JP] Japan .................. 2-273826

[51] Int. Cl.⁵ .................. G01D 15/06; G03G 15/01
[52] U.S. Cl. .................. 346/157; 355/327
[58] Field of Search .................. 346/157, 160; 358/78, 358/80, 75; 355/327, 326

[56] References Cited

U.S. PATENT DOCUMENTS

| 4,578,688 | 3/1986 | Okuno | 346/157 |
| 4,761,046 | 8/1988 | Funato | 355/327 X |
| 4,887,101 | 12/1989 | Hirose et al. | 346/157 X |
| 4,893,179 | 1/1990 | Ito | 355/327 X |
| 4,916,547 | 4/1990 | Katsumata et al. | 346/157 X |
| 5,081,528 | 1/1992 | Hiyashi et al. | 358/75 |

FOREIGN PATENT DOCUMENTS 0247772 12/1987 .
0291738 11/1988 European Pat. Off. .
2226929 7/1990 United Kingdom .

Primary Examiner—R. L. Moses
Attorney, Agent, or Firm—Fitzpatrick, Cella, Harper & Scinto

[57] ABSTRACT

An image forming apparatus includes, a plurality of image forming devices which are arranged in parallel in correspondence to color components of a stored color image signal so as to reproduce a color image according to the color image signal. A conveying device conveys recording materials among the image forming means; and a control device controls the memory device, image forming devices, and conveying device so as to automatically sequentially form the color components of the color image signal onto different media, respectively.

4 Claims, 3 Drawing Sheets

METHOD AND APPARATUS FOR FORMING IMAGE HAVING PLURAL IMAGE FORMING STATIONS

BACKGROUND OF THE INVENTION

1. Field of the Invention

The present invention relates to an image forming apparatus having a plurality of image forming sections and, more particularly, to an apparatus and method for forming a color image.

2. Related Background Art

A color copying apparatus is constructed so as to form an image by overlapping three colors of cyan, magenta and yellow or four colors including black. In recent years, an apparatus for forming an image of a better reproducibility by digital image processes has been proposed. By using the digital image processes, not only is the image improved but also various functions such as color conversion, trimming, and the like can be realized.

SUMMARY OF THE INVENTION

As mentioned above, color copying apparatus generally can execute various image processes, such as a divisional block copy function. According to this function, an image is generated to an independent recording medium for each output color like a block copy which is used for printing. According to the divisional block copy function, since an image is formed to an individual recording medium for each color, there is a problem that it takes a long output time as compared with the case of the ordinary output where images are overlappingly printed onto the same medium.

Particularly, in an image forming apparatus in which a plurality of image forming sections are arranged in parallel and a recording medium is conveyed among the forming sections, there are still many points to be improved even when such a divisional block copy function is provided.

It is an object of the invention to provide the divisional block copy function even to an image forming apparatus in which a plurality of image forming sections are arranged in parallel and a recording medium is conveyed among the image forming sections.

The other objects and features of the present invention will be apparent from the following description of the embodiment.

DETAILED DESCRIPTION OF THE PREFERRED EMBODIMENTS

Figure 1:
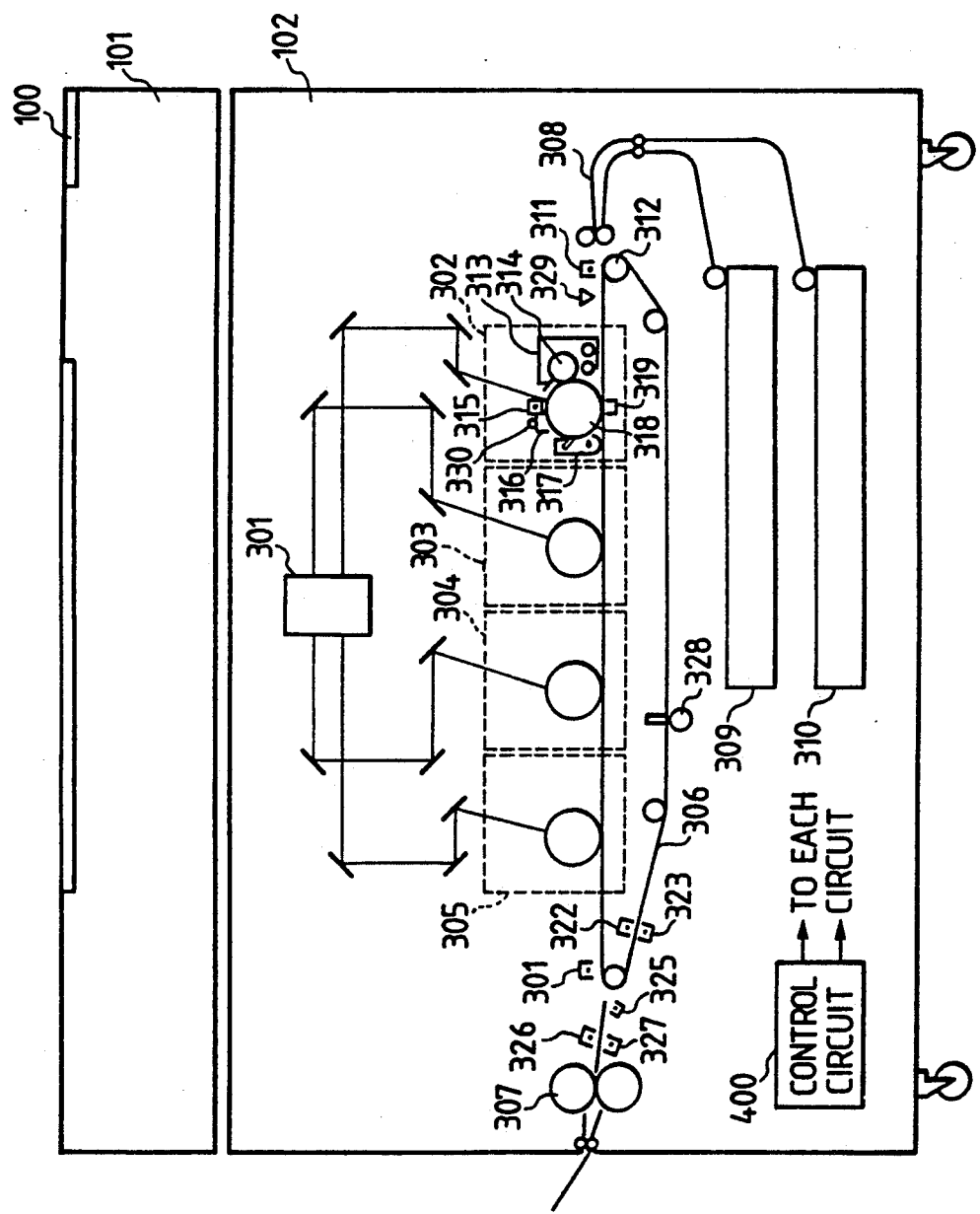
FIG. 1 is a diagram of a color copying apparatus which embodies the present invention.

FIG. 1 shows a cross section of a digital color copying apparatus which embodies the present invention. In the diagram, reference numeral 100 denotes an operating section which is provided to set a paper size to form an image and a divisional block copy mode. Reference numeral 101 denotes a reader section to read an original; 102 a printer section to perform a copy output on the basis of the read image signal; 301 a polygon scanner to scan a laser beam onto a photo sensitive drum; and 302 an image forming section of magenta (M) at the first stage. Image forming sections each having a construction similar to the above construction are designated by reference numerals 303, 304 and 305 with respect to respective colors of cyan (C), yellow (Y) and black (K).

In the image forming section 302, reference numeral 318 denotes a photo sensitive drum to form a latent image by the exposure of a laser beam and 313 a developing device to develop a toner image onto the drum 318. Reference numeral 314 in the developing device 313 denotes a sleeve for applying a developing bias and performing a toner development; 315 indicates a primary charging device for charging the photo sensitive drum 318 to a desired potential; 317 denotes a cleaner to clean the surface of the drum 318 after completion of the copy transfer, 316 denotes an auxiliary charging device for discharging the surface of the drum 318 which has been cleaned by the cleaner 317, thereby obtaining a good charging state by the primary charging device 315; 330 denotes a pre-exposing lamp to erase the residual charges on the drum 318; and 319 denotes a copy transfer charging device for discharging from the back surface of a copy transfer belt 306 and for copy transferring the toner image on the drum 318 to a copy transfer medium.

Reference numerals 309 and 310 denote cassettes to enclose the copy transfer, or recording media; 308 denotes a paper feed section to supply the copy transfer media from the cassettes 309 and 310; 311 denotes an adsorbing charging device to adsorb the copy transfer medium fed by the paper feed, section onto the copy transfer belt 306; and 312 denotes a copy transfer belt roller which is used for rotation of the copy transfer belt 306 and adsorbs and charges the copy transfer medium onto the copy transfer belt 306 together with the adsorbing charging device 311 as a pair.

Reference numeral 324 denotes a discharging/charging device for enabling the copy transfer medium to be easily peeled off from the copy transfer belt 306; 325 denotes a peel-off charging device to prevent an image disturbance by the peel-off discharge when the copy transfer medium is separated from the copy transfer belt; 326 and 327 denote pre-fixing charging devices for compensating the adsorbing force of the toner on the copy transfer medium after it is peeled off, thereby preventing an image fluctuation; 322 and 323 denote copy transfer belt discharging/charging devices for discharging the copy transfer belt 306, thereby electrostatically initializing the copy transfer belt 306; and 328 denotes a belt cleaner to clean dirt from the copy transfer belt 306.

Reference numeral 307 denotes a fixing device for thermally fixing onto the copy transfer medium the toner image on the copy transfer medium which has been separated from the copy transfer belt 306 and again charged by the pre-fixing charging devices 326 and 327.

Reference numeral 329 denotes a paper front edge sensor to detect the front edge of the copy transfer medium fed onto the copy transfer belt by the paper feed section 308. A detection signal from the paper front edge sensor is sent from the printer section to the reader section and is used as a subscanning sync signal when a video signal is sent from the reader section to the printer section. Reference numeral 400 denotes a control circuit to control a conveying motor and a reading timing of image data from an image memory, which will be explained hereinlater in FIG. 2.

Figure 2:
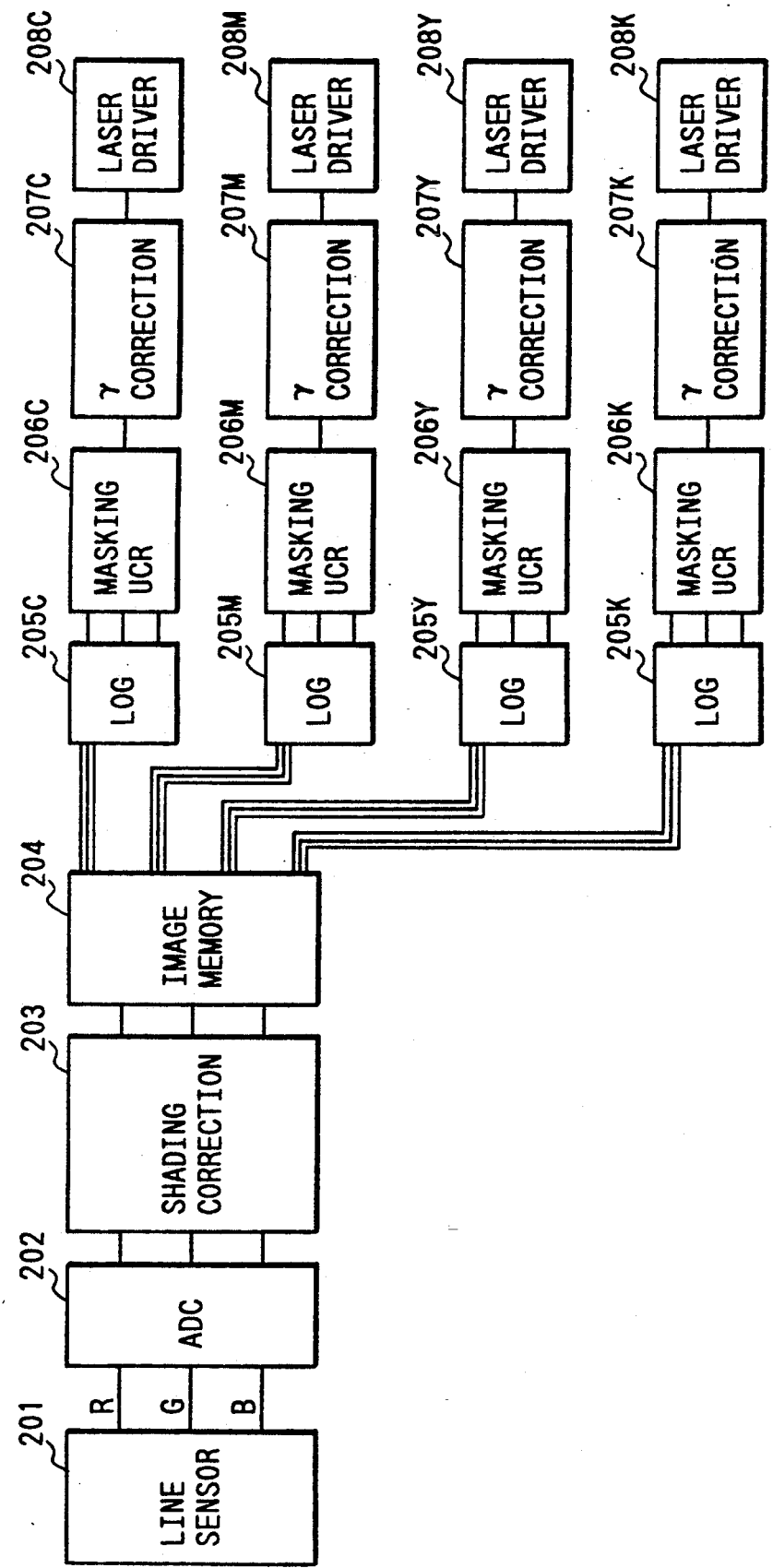
FIG. 2 is a schematic diagram of an image processing section of the color copying apparatus which embodies the invention.

FIG. 2 shows an image processing system of the foregoing reader section. Reference numeral 201 denotes a line sensor which generates R, G and B data in the embodiment; 202 denotes an A/D converter; 203 denotes a shading correcting circuit; and 204 denotes an image memory which can accumulate data of a color original of the A3 size in the embodiment as color image data. When the image data of the color original is stored, the R, G and B data are separated to the brightness and chromaticity and are converted into, for instance, L, a and b data and, thereafter, are compressed. By expanding the data when reading out the data from the memory, the image data can be accumulated by a memory of a smaller capacity. Reference numerals 205C, 205M, 205Y, 205K denote LOG converting circuits; 206C, 206M, 206Y and 206K masking/UCR circuits; 207C, 207M, 207Y and 207K $\gamma$ correcting circuits; and 208C, 208M, 208Y and 208K laser drivers. A color image signal which has been read by one scan of the line sensor 201 is converted into a digital signal by the A/D converter 202 and is subjected to a shading correction by the shading correcting circuit 203. After that, the signal is once stored into the image memroy 204. The signals to the image forming sections of C, M, Y and K are individually taken out from the image memory 204 at partially the same timing and are processed. Explanation will now be made with respect to the C signal. The C signal is converted into the density signal by the LOG converting circuit 205C and is subjected to a masking process and an undercolor removal by a masking UCR circuit 206C, so that the image signal of C is derived. After that, the signal is subjected to a sensitivity correction of the photo sensitive drum of the printer section by the $\gamma$ correcting circuit 207C. A semiconductor laser is driven by the laser driver 208C, thereby forming a latent image of C onto the photo sensitive drum. Since similar processes are also executed with regard to the signals of M, Y and K, their descriptions are omitted.

The operation in the case of executing the divisional block copy function by the apparatus of the embodiment will now be described. In the case of performing a divisional block copy, four copy transfer media $P_1$, $P_2$, $P_3$ and $P_4$ are supplied from the casette 309 or 310. Images are independently formed onto the four copy transfer, or recording, media by the image forming sections 302, 303, 304 and 305, respectively, thereby forming images of monotonous colors of C, M, Y and K on each medium.

Figure 3A:
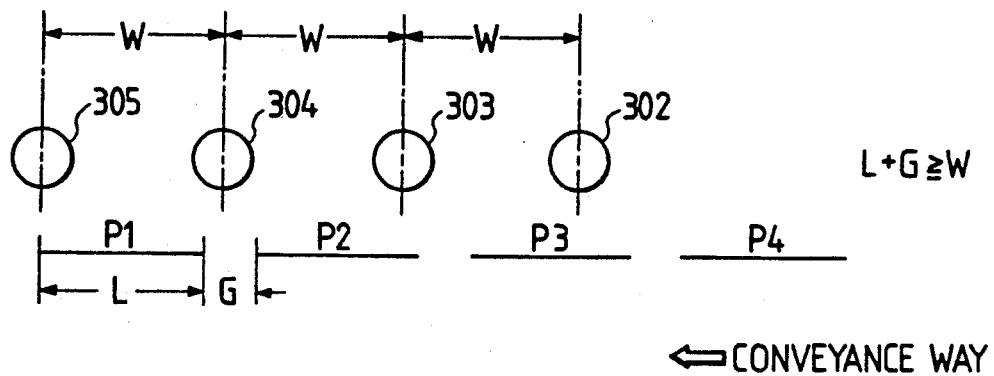
FIGS. 3(a) and 3(b) are diagrams showing the image forming operation.

When the sum of a length L of copy transfer medium and a distance G between the copy transfer media is longer than a distance W between the image forming sections, the image formation of K is executed for the supplied copy transfer media $P_1$, $P_2$, $P_3$ and $P_4$ when the medium $P_1$ reaches the image forming section 305. Subsequently, the image of Y is formed when $P_2$ reaches 304 and then the image of M is formed when $P_3$ reaches 303. The image of C is formed when $P_4$ reaches 302. In this manner, the control is executed so as to sequentially form those images. That is, the control is performed so as to form the images in accordance with the order from the image forming section on the discharge side. FIG. 3 shows positional relations of the image forming sections and the copy transfer media. As shown in FIG. 3(a), when the copy transfer medium $P_1$ reaches the image forming section 305, the image forming operation is started for the first time. In this instance, $P_2$, $P_3$ and $P_4$ don't reach yet the image forming sections 304, 303 and 302, respectively. After the image was formed onto the last copy transfer medium $P_4$ by 302, the medium $P_4$ is discharged through the fixing device, or discharge section, and the image formation is finished.

Figure 3B:
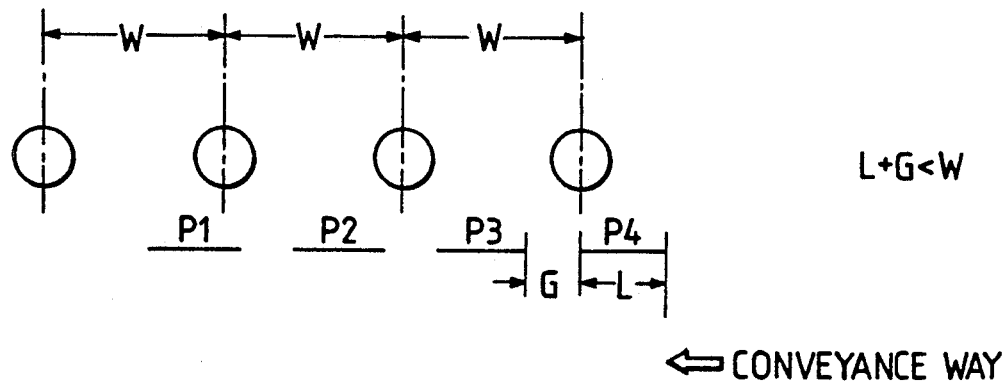

When the sum of the length L of copy transfer medium and the distance G between the copy transfer media is shorter than the distance W between the image forming sections, as shown in FIG. 3(b), $P_4$ reaches the image forming section 302 before $P_1$, $P_2$ and $P_3$ among the supplied copy transfer media $P_1$, $P_2$, $P_3$ and $P_4$ reach the image forming sections 305, 304 and 303. When $P_4$ reaches the image forming section 302 and the image formation is started, $P_3$ subsequently reaches the image forming section 303. After that, $P_2$ reaches 304 and $P_1$ successively reaches 305 and the images are formed.

By constructing the image forming order as mentioned above and controlling the operations of the image forming sections, the reader section can execute a series of initial operations such as shading and the like for a period of time which is required until the copy transfer medium $P_1$ reaches the image forming section 305 or until the copy transfer medium $P_4$ reaches the image forming section 302. The total time for image formation is reduced. If the order of the colors to form the images is reversed, it is necessary for the printer section to be held in a standby state until the completion of the initial operations of the reader section. Consequently, a longer operating time than that by the embodiment discussed above is necessary.

The switching between the two operations shown in FIGS. 3(a) and 3(b) mentioned above is executed according to the operation of the operating section 100 or is automatically performed by a control circuit 400 in accordance with the length of copy transfer medium.

Other embodiments

The above embodiment is not limited to the divisional block copy function of the color copying apparatus but the invention can be similarly applied to the case of generating images onto independent recording media every image forming section. The invention can be embodied by preparing the independent images for C, M, Y and K in the image memory, respectively.

Although the divided block copy images have been formed by using different colors in the embodiment discussed above, respectively, by replacing all of the toners in the image forming sections to, for example, black toner, it is possible to perform the divisional block copy by the same color as if it is executed in printing.

The invention is not limited to the image forming apparatus using the electrophotographic process but can be also applied to other recording apparatuses such as an ink jet recording apparatus.

The invention particularly provides a large effect in a recording apparatus which multiplexes color images while conveying a recording medium by a belt.

As described above, by executing the outputting operations sequentially from the side near the discharge portion of the recording medium, the recording medium can previously be conveyed, so that the operating time is reduced.

According to the embodiments as described above, the divided block copy image can be promptly obtained.

The present invention is not limited to the foregoing embodiments but includes various modifications within the scope of claims of the invention.

I claim:

1. An image forming apparatus comprising:
    a plurality of image forming means arranged sequentially;
    a discharge section for discharging a plurality of recording media on which images have been formed, wherein each of said plurality of image forming means forms an image onto each one of the recording media, respectively; and
    means for controlling said plurality of image forming means so as to sequentially discharge the recording media, wherein one of a plurality of color separations is formed on each of the recording media by respective image forming means.

2. An image forming apparatus according to claim 1, wherein when a total length of a length of one recording medium and an interval between the one recording medium and another recording medium is longer than a distance between one image forming means and another image forming means, image formation is executed sequentially from the image forming means near the discharge section to the image forming means distant from the discharge section.

3. An image forming apparatus comprising:
    memory means for storing a given color image signal;
    a plurality of image forming means which are arranged in parallel according to color components of said color image signal so that each image forming means reproduces one color component of the color image corresponding to said color image signal;
    conveying means for conveying a plurality of recording media to said plurality of image forming means; and
    control means for controlling said memory means, said plurality of image forming means, and said conveying means to automatically sequentially form each one of the color components of said color image signal onto each of the recording media, respectively.

4. An image forming apparatus comprising:
    converting means for scanning an original image and converting the image into a color image signal;
    memory means for storing the color image signal converted by said converting means;
    a plurality of image forming means which are arranged in parallel according to color components of said color image signal so that each image forming means reproduces one color component of the color image corresponding to said color image signal;
    conveying means for conveying a plurality of recording media to said plurality of image forming means; and
    control means for controlling said memory means, said plurality of image forming means, and said conveying means to automatically sequentially form each one of the color components of said color image signal onto each of the recording media by one scan of said converting means, respectively.

* * * * *

UNITED STATES PATENT AND TRADEMARK OFFICE
CERTIFICATE OF CORRECTION

PATENT NO. : 5,281,981

DATED : January 25, 1994

INVENTOR(S) : KOJI KAJITA

It is certified that error appears in the above-identified patent and that said Letters Patent is hereby corrected as shown below:

ON TITLE PAGE

In [56] References Cited, under FOREIGN PATENT DOCUMENTS:

"0247772  12/1987 ." should read
--0247772  12/1987  European Pat. Off. .--.

COLUMN 2

Line 17, "transfer," should read --transfer;--.
Line 32, "feed," should read --feed--.

COLUMN 3

Line 44, "copy," should read --copy function,--.
Line 47, "recording," should read --recording--.

COLUMN 6

Line 7, "the color" should read --the plurality of color--.
Line 8, "each of" should read --each one of said plurality of--.
Line 27, "the color" should read --the plurality of color--.

UNITED STATES PATENT AND TRADEMARK OFFICE
CERTIFICATE OF CORRECTION

PATENT NO. : 5,281,981
DATED : January 25, 1994
INVENTOR(S) : KOJI KAJITA

It is certified that error appears in the above-identified patent and that said Letters Patent is hereby corrected as shown below:

COLUMN 6

Line 28, "each of" should read --each one of said plurality of--.

Signed and Sealed this

Twenty-sixth Day of July, 1994

BRUCE LEHMAN

Attest:

*Attesting Officer*  *Commissioner of Patents and Trademarks*